United States Patent
Bainbridge et al.

(10) Patent No.: US 12,237,975 B2
(45) Date of Patent: Feb. 25, 2025

(54) CLOUD-NATIVE APPROACH TO SUPPORT DESIRED STATE MODEL RECONCILIATION WITH NETWORKING EQUIPMENT

(71) Applicant: Ciena Corporation, Hanover, MD (US)

(72) Inventors: David Bainbridge, Summerville, SC (US); Karthick Ramanarayanan, Fremont, CA (US); Himani Chawla, Haryana (IN); Marc Holness, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/469,168

(22) Filed: Sep. 18, 2023

(65) Prior Publication Data
US 2024/0205091 A1    Jun. 20, 2024

(30) Foreign Application Priority Data

Dec. 20, 2022 (IN) .............................. 202211073824

(51) Int. Cl.
| | | |
|---|---|---|
| H04L 41/0895 | (2022.01) | |
| G06F 9/54 | (2006.01) | |
| H04L 41/0803 | (2022.01) | |
| H04L 41/5009 | (2022.01) | |

(52) U.S. Cl.
CPC ............ *H04L 41/0895* (2022.05); *G06F 9/54* (2013.01); *H04L 41/0803* (2013.01); *H04L 41/5009* (2013.01)

(58) Field of Classification Search
CPC ............ H04L 41/0895; H04L 41/0803; H04L 41/0866; H04L 41/0869; H04L 41/0873; H04L 41/0681; H04L 41/08; H04L 41/5009; G06F 2201/81; G06F 9/54
See application file for complete search history.

(56) References Cited

U.S. PATENT DOCUMENTS

| | | |
|---|---|---|
| 7,590,054 B1 | 9/2009 | Holness et al. |
| 7,600,003 B1 | 10/2009 | Okmianski et al. |
| 7,765,288 B2 | 7/2010 | Bainbridge et al. |
| 7,792,044 B2 | 9/2010 | Holness et al. |
| 7,802,145 B1 | 9/2010 | Bainbridge et al. |
| 8,018,841 B2 | 9/2011 | Holness et al. |
| 8,085,676 B2 | 12/2011 | Skalecki et al. |

(Continued)

OTHER PUBLICATIONS

Feng et al. (WO 2023005543A1), Query Method and Apparatus, and Device, pp. 1-44, Jun. 27, 2022.*

*Primary Examiner* — Tonia L Dollinger
*Assistant Examiner* — Linh T. Nguyen
(74) *Attorney, Agent, or Firm* — Baratta Law PLLC; Lawrence A. Baratta, Jr.

(57) ABSTRACT

A method, implemented by a controller, includes steps of: subsequent to converting a bespoke model to Open Application Programming Interface (API) Schema that is Custom Resource Definition (CRD), receiving the CRD; receiving a target that is a data record that represents a network entity; receiving a configuration model instance for the target, wherein the configuration model instance includes one or more values that are compliant to the CRD and the one or more values represent a desired state of the network entity; receiving an observed state of the network entity; and determining drift between the observed state and the desired state.

20 Claims, 9 Drawing Sheets

(56) References Cited

U.S. PATENT DOCUMENTS

| | | |
|---|---|---|
| 8,149,692 B2 | 4/2012 | Holness et al. |
| 8,185,824 B1 | 5/2012 | Mitchell et al. |
| 8,295,175 B2 | 10/2012 | Ellis et al. |
| 8,305,938 B2 | 11/2012 | Holness et al. |
| 8,433,795 B2 | 4/2013 | Wang et al. |
| 8,509,061 B2 | 8/2013 | Holness et al. |
| 8,553,697 B2 | 10/2013 | Allan et al. |
| 8,588,060 B2 | 11/2013 | Holness |
| 8,625,410 B2 | 1/2014 | Abdullah et al. |
| 8,656,026 B1 | 2/2014 | Prasad et al. |
| 8,737,198 B1 | 5/2014 | Holness et al. |
| 8,792,509 B2 | 7/2014 | Martin et al. |
| 8,855,122 B2 | 10/2014 | Bottorff et al. |
| 8,953,456 B2 | 2/2015 | Mohan et al. |
| 9,025,435 B2 | 5/2015 | Holness et al. |
| 9,075,717 B2 | 7/2015 | Mohan, Jr. et al. |
| 9,160,563 B2 | 10/2015 | Ryoo et al. |
| 9,197,493 B2 | 11/2015 | Holness et al. |
| 9,203,549 B2 | 12/2015 | Holness et al. |
| 9,203,644 B2 | 12/2015 | Holness et al. |
| 9,319,268 B2 | 4/2016 | Allan et al. |
| 9,344,323 B2 | 5/2016 | Civil et al. |
| 9,401,817 B2 | 7/2016 | Holness et al. |
| 9,893,937 B2 | 2/2018 | Holness et al. |
| 9,960,993 B2 | 5/2018 | Hu et al. |
| 10,122,619 B2 | 11/2018 | Holness et al. |
| 10,263,867 B2 | 4/2019 | Holness et al. |
| 10,425,153 B2 | 9/2019 | Holness et al. |
| 10,476,763 B2 | 11/2019 | Holness |
| 10,541,877 B2 | 1/2020 | Bainbridge et al. |
| 10,623,293 B2 | 4/2020 | Hu et al. |
| 10,652,024 B2 | 5/2020 | Holness |
| 10,819,646 B2 | 10/2020 | Srivastava et al. |
| 10,826,813 B2 | 11/2020 | Holness |
| 11,595,302 B2 | 2/2023 | Ramsland et al. |
| 11,658,900 B2 | 5/2023 | Holness et al. |
| 2005/0068950 A1 | 3/2005 | Ellis et al. |
| 2005/0071453 A1 | 3/2005 | Ellis et al. |
| 2005/0099949 A1 | 5/2005 | Mohan et al. |
| 2005/0099951 A1 | 5/2005 | Mohan et al. |
| 2005/0099954 A1 | 5/2005 | Mohan et al. |
| 2005/0099955 A1 | 5/2005 | Mohan et al. |
| 2007/0064700 A1 | 3/2007 | Holness et al. |
| 2007/0268817 A1 | 11/2007 | Smallegange et al. |
| 2010/0135291 A1 | 6/2010 | Martin et al. |
| 2012/0092985 A1 | 4/2012 | Caird et al. |
| 2012/0281710 A1 | 11/2012 | Holness et al. |
| 2014/0177439 A1 | 6/2014 | Holness et al. |
| 2016/0352570 A1 | 12/2016 | Holness |
| 2018/0331931 A1 | 11/2018 | Holness |
| 2019/0116096 A1 | 4/2019 | Holness et al. |
| 2020/0133689 A1* | 4/2020 | Ferrell ................. G06F 9/45558 |
| 2020/0372081 A1* | 11/2020 | Bain ................... G06F 16/2358 |
| 2021/0036910 A1 | 2/2021 | Holness |
| 2021/0226816 A1 | 7/2021 | Holness |
| 2021/0377139 A1 | 12/2021 | Holness et al. |
| 2021/0385120 A1 | 12/2021 | Curtis et al. |
| 2022/0350675 A1* | 11/2022 | Navali ................... H04L 47/781 |
| 2022/0350687 A1* | 11/2022 | Baid ....................... G06F 9/547 |
| 2022/0360513 A1* | 11/2022 | Matham ............... H04L 41/0853 |
| 2023/0091058 A1* | 3/2023 | Cantwell .............. G05B 13/042 700/97 |
| 2023/0325253 A1* | 10/2023 | Hasti ..................... G06F 9/5077 |
| 2023/0409369 A1* | 12/2023 | Liu ...................... H04L 41/0895 |
| 2024/0004686 A1* | 1/2024 | Brezak ................ G06F 9/44505 |
| 2024/0129161 A1* | 4/2024 | Miriyala ............... H04L 47/125 |

* cited by examiner

CLOUD-NATIVE APPROACH TO SUPPORT DESIRED STATE MODEL RECONCILIATION WITH NETWORKING EQUIPMENT

CROSS-REFERENCE TO RELATED APPLICATION(S)

The present disclosure claims priority to Indian Patent Application No. 202211073824, filed Dec. 20, 2022, the contents of which are incorporated by reference in their entirety.

FIELD OF THE DISCLOSURE

The present disclosure relates generally to networking and computing. More particularly, the present disclosure relates to systems and methods for a cloud native approach to support desired state model reconciliation with networking equipment.

BACKGROUND OF THE DISCLOSURE

The Cloud Native Computing Foundation (CNCF) provides technology to orchestrate containers as part of a microservices architecture. As described herein, the cloud-native model definitions refer to a resource schema defined using the Open Application Programming Interface (API) Schema (available online at spec.openapis.org/oas/latest.html), the contents of which are incorporated by reference. Schema of this type can be utilized with cloud-native frameworks such as Kubernetes. When used with Kubernetes, resource definitions using Open API Schema are commonly referred to as Custom Resource Definitions (CRDs). The present disclosure utilizes the term "cloud-native" when referring to these models, schema, etc. Cloud-native is the software approach of building, deploying, and managing modern applications in cloud computing environments. Cloud-native applications include software containers, microservices, software-defined infrastructure, APIs, etc.

Networking equipment is fundamental for supporting cloud computing environments. For example, networking equipment can include optical network elements such as Reconfigurable Optical Add/Drop Multiplexers (ROADMs), switches, routers, servers, applications, and the like, collectively referred to herein as "network entities." Network entities are not supported by cloud-native systems today. Network entities commonly use YANG (Yet Another Next Generation) models directly, sometimes encoded as Extensible Markup Language (XML), to represent the network entity (target) configuration state. YANG is a data modeling language for the definition of data sent over network management protocols such as the NETCONF, RESTCONF, and gNMI. The YANG data modeling language is maintained by the NETMOD working group in the Internet Engineering Task Force (IETF) and initially was published as RFC 6020 in October 2010, with an update in August 2016 (RFC 7950), the contents of which are incorporated by reference. XML is a very verbose data encoding and not compatible [used] with existing CNCF tooling.

Usage of YANG along with a compatible protocol, such as NETCONF, provides a mechanism to query/edit target configurations, but does not support a detection of drift, when a desired and an observed state are different and does not support automatic reassert/reconciliation of the desired state. Usage of YANG along with a compatible protocol, such as NETCONF, does not currently have support in the cloud-native ecosystem. Cloud-native orchestration systems, such as Kubernetes, do not currently support the specification of a desired state for network elements. Because YANG is a modeling language, it does not provide infrastructure to support intent specification, decomposition, and ownership/status relationships.

BRIEF SUMMARY OF THE DISCLOSURE

The present disclosure relates to systems and methods for a cloud-native approach to support desired state model reconciliation with networking entities. The present disclosure includes (1) generation of cloud-native compatible resources (i.e., Open API Schema definitions compliant with CNCFs resource schema to be utilized with the Kubernetes system) from existing YANG model (or module); (2) conversion of cloud-native model instances of the generated schema, to a compatible protocol, and to a compatible payload, for a controller to push data to network entities (as described herein, anything in the network that understands YANG); (4) use of asynchronous change notification and/or periodic cycle to detect drift and trigger reconciliation between desired & observed state (desired is the intent and observed is what the network entity is currently showing, and drift is a delta that could require reconciliation); (5) optimize target (network entity) updates by querying, diffing, and generating a minimal edit to the network entity's config; and (6) defining a mechanism to associate multiple model instances to a single network entity.

In various embodiments, the present disclosure can include a method having steps, a controller configured to implement the steps, and a non-transitory computer-readable medium with instructions that, when executed, cause at least one processor to implement the steps. The steps include, subsequent to converting a bespoke model to Open Application Programming Interface (API) Schema that is a Custom Resource Definition (CRD), receiving the CRD; receiving a target that is a data record that represents a network entity; receiving a configuration model instance for the target, wherein the configuration model instance includes one or more values that are compliant to the CRD and the one or more values represent a desired state of the network entity; receiving an observed state of the network entity; and determining drift between the observed and desired states.

The steps can include, based on one of a range and a threshold, and responsive to determined drift being in violation for some predetermined time, triggering reconciliation to achieve the desired state. The network entity can be one of a server, a network element, an application, a virtualized instance of the server or the network element, and an endpoint in a network that utilizes YANG. The receiving an observed state can be based on one or more of a change notification from and a periodic poll to the network entity. The network entity can have multiple bespoke models each being converted to a corresponding CRD.

The bespoke model can utilize YANG. The bespoke model can be one of locally stored schema files and schema directly queried from the network entity. The drift can be one or more of (1) static drift associated with differences between a desired configuration and an observed configuration, and (2) constraint drift associated with differences between desired characteristics and observed characteristics. The desired and observed characteristics can be any of latency, jitter, bandwidth, and any Key Performance Indicator (KPI).

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a diagram of abstract to specific intent decomposition, for configuration and monitoring between servers, network elements, applications, virtualization, and the like.

DETAILED DESCRIPTION OF THE DISCLOSURE

The present disclosure relates to systems and methods for a cloud-native approach to support desired state model reconciliation with networking entities. The present disclosure includes (1) generation of cloud-native compatible resources (i.e., Open API Schema definitions compliant with CNCFs resource schema to be utilized with the Kubernetes system) from existing YANG model (or module0; (2) conversion of cloud-native model instances of the generated schema, to a compatible protocol, and to a compatible payload, for a controller to push data to network entities (as described herein, anything in the network that understands YANG); (4) use of asynchronous change notification and/or periodic cycle to detect drift and trigger reconciliation between desired & observed state (desired is the intent and observed is what the network entity is currently showing, and drift is a delta that could require reconciliation); (5) optimize target (network entity) updates by querying, diffing, and generating a minimal edit to the network entity's config; and (6) defining a mechanism to associate multiple model instances to a single network entity.

An objective of the present disclosure is to introduce a mechanism to manage network resources that increases the velocity of new operational capabilities while decreasing the risk of human induced errors, namely using cloud-native techniques, such as a Kubernetes controller to configure network entities that understand YANG. Additionally, the mechanism is meant to integrate network resources with the best practices, policies, and tools utilized for managing compute and storage resources.

By leveraging the industry best practices around software development (DevOps) as well as around compute and storage resource management (GitOps) to inform and integrate the management of network resources, it is believed that network operations can be improved. Key to this improvement is the mechanism described herein to introduce a declarative state intent capability for network resources that leverages existing device capabilities while enabling the use of cloud-native practices, policies, and tools, i.e., IntOps—(intent operations) to change the conversation to focus on the desired outcomes.

The present disclosure leverages cloud-native technologies to provide a declarative state reconciliation capability to network entities, using existing YANG modules over a supported protocol (e.g., NETCONF, RESTCONF, gNMI, etc.). Each network entity can be specified to use a single protocol provider. In this context a network entity, or target (which is a data record in the controller that represents the network entity), can be either a physical network element, a virtual network element, or any compute (physical or virtual) that responds to YANG based configuration requests, i.e., any endpoint in the network that is YANG capable.

There are three aspects to the present disclosure, namely:

(1) Automated generation of cloud-native model definitions (schema) from existing YANG modules. The generation can be from locally stored YANG schema files or can be from schema directly queried from network entities (represented in a controller as a target). The generated cloud-native compliant schema can be dynamically added, removed, updated, and/or versioned into a controller.

(2) A component, commonly called the controller, that provides the behavior or actions taken when an instance of the model is created, modified, or deleted. This controller utilizes cloud-native representations of the YANG model instances with the format and protocol (e.g., XML based NETCONF request) required to provision the state of on the network entity. Typically, in cloud-native, declared intent systems the entire configuration of a target is embodied in a single document (manifest); when working with YANG modules where multiple model instances can be applied to a single target, a mechanism was developed to associate model instances to a single target, where each model instance contains a well-defined label name whose values references the target to which it should be applied. As described herein, a target refers to a representation of a network entity in the controller. This can be a data record that identifies to the controller how to connect to the network entity (e.g., Internet Protocol (IP) address, credentials, certificates, etc.). A network entity is any endpoint in a network that understands YANG models.

The controller detects configuration drift, i.e., a difference between the desired and observed state on the network entity and reasserts the desired state to the network entity. When reasserting the desired state, a minimal change set is calculated and pushed to the network entity. Simply put, the controller pushes minimal YANG model instance edits back to the network entity to restore the desired state. Configuration drift is detected, where possible, via change notifications to minimize configuration polling from the network entity. When change notifications are not possible, a polling cycle can be configured for configuration drift detection.

(3) This work represents an intent capability for specifying the desired state of targets, where the YANG modules represent the most specific intent as it cannot be decomposed further to the targets. This work provides a mechanism to layer increasingly more abstract intents from these specific intents to provide complex network connectivity, such as a network fabric that manages connectivity via a Segment Routing capability on which end point connectivity can be specified as further intents each with connectivity constraints such as bandwidth, latency, jitter, and the like.

Abstract to Specific Intent Decomposition

Figure 1:
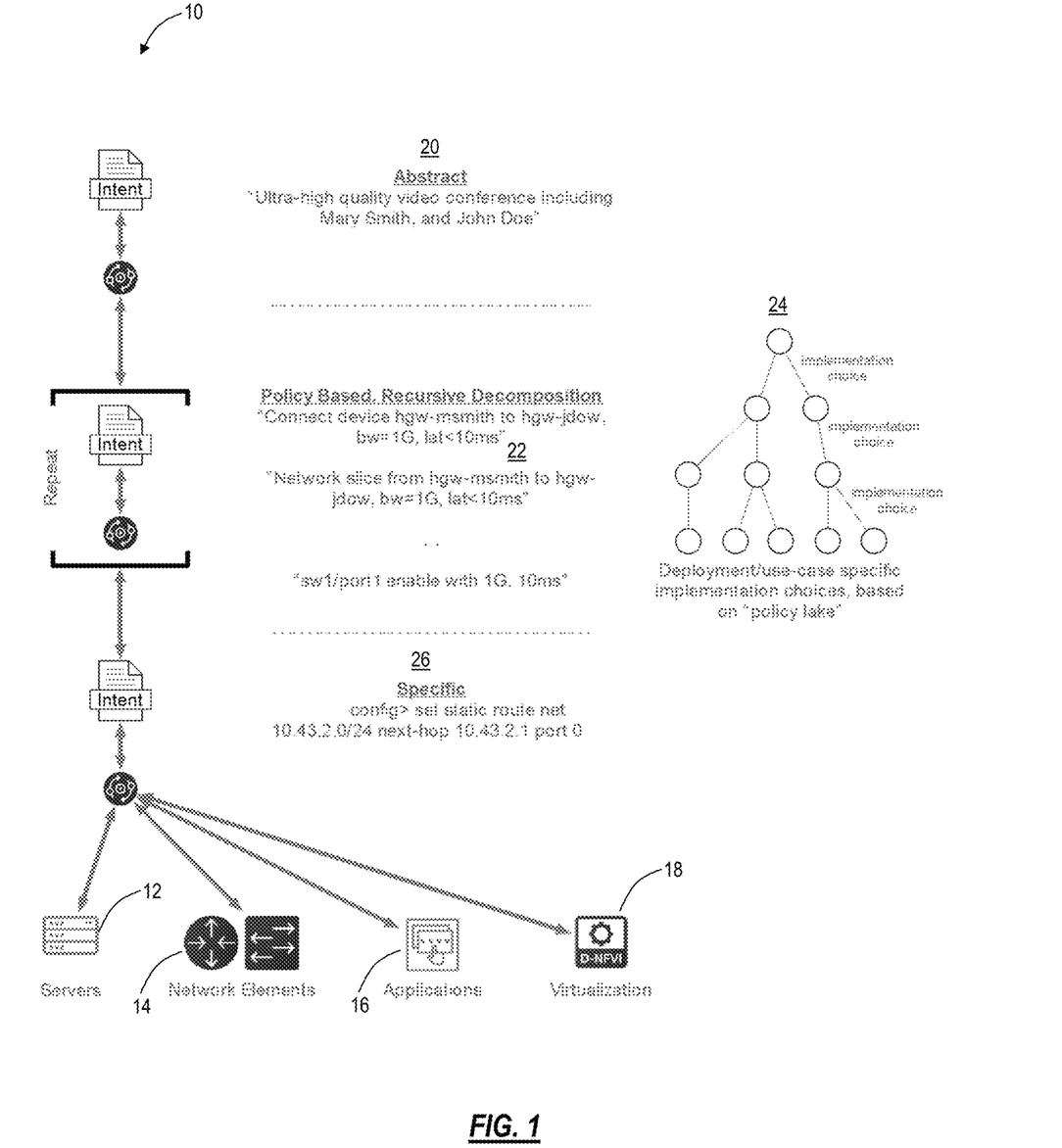

FIG. 1 is a diagram of abstract to specific intent decomposition 10, for configuration and monitoring between servers 12, network elements 14, applications 16, virtualization 18, and the like. As described herein, a network entity can be one of the servers 12, network elements 14, applications 16, virtualization 18, and the like. The virtualization 18 is meant to represent virtualized instances of the servers 12 and/or network elements 14. Abstract intents 20 represent high level desires for the network, i.e., connectivity and constraints, e.g., "ultra-high quality video conferencing including Mary Smith and John Doe." The abstract intents 20 are decomposed into more and more specific intents 22 that provide the initial abstract intent. This decomposition is via a policy based, recursive decomposition 24. Examples of the specific intents 22 include "connect device hgw-msmith (Home gateway of Mary Smith) to hgw-jdoe (Home gateway of John Doe), bw (bandwidth)=1G, lat (latency)<10 ms," "network slice from hgw-msmith to hgw-jdoe, bw=1G, lat<10 ms," and "sw1 (switch 1)/port1 enable with 1G, 10 ms."

Finally, the most specific intent 26 is the actual device (target) configuration, e.g., of the network elements, e.g., "config> set static route 10.43.2.0/24 next-hop 10.43.2.1, port 0."

Figure 2:
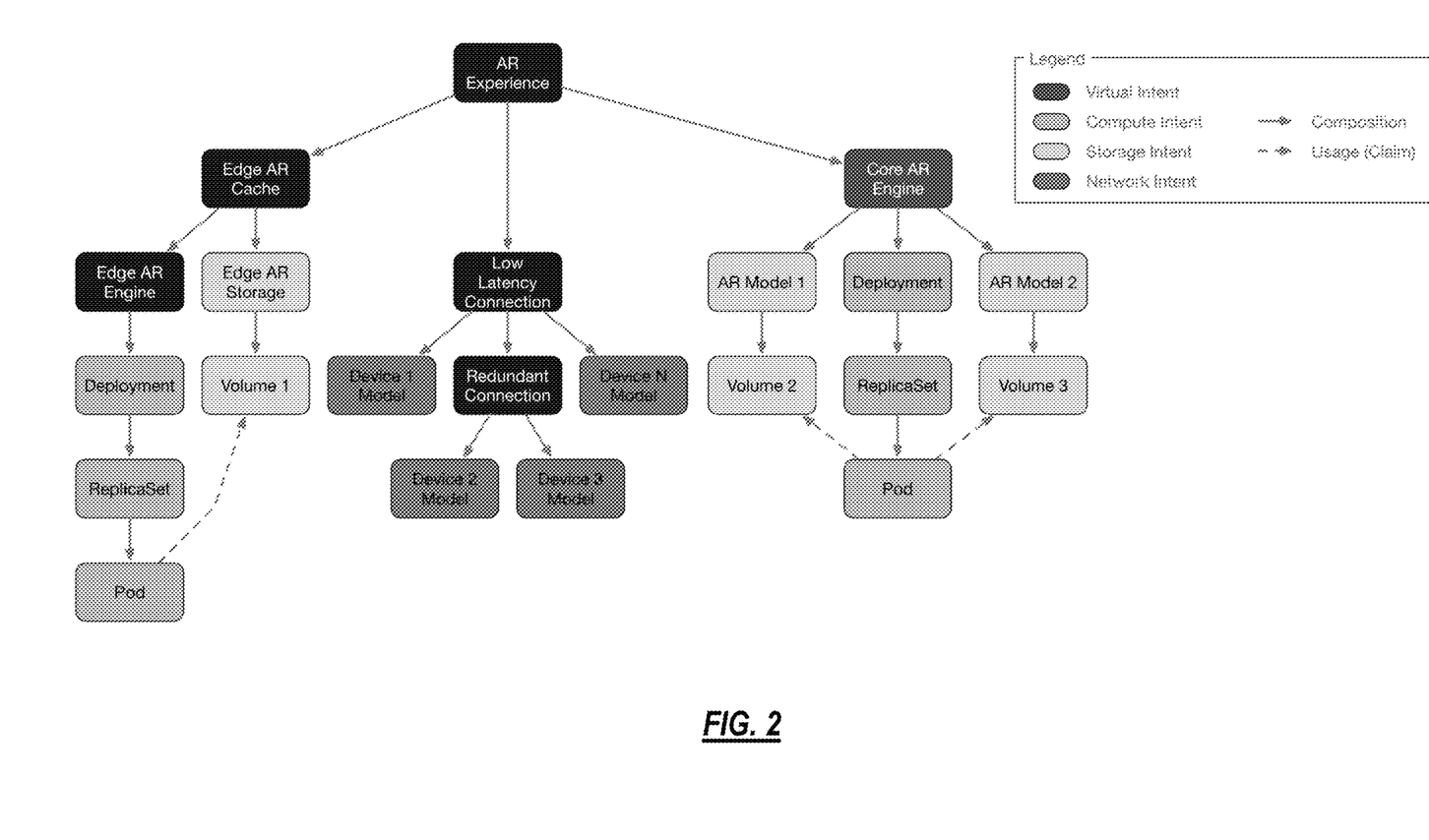
FIG. 2 is an example of an intent decomposition for an Augmented Reality (AR) application.

FIG. 2 is an example of an intent decomposition for an Augmented Reality (AR) application. This includes intents of virtual intents, compute intents, storage intents, and network intents. FIG. 2 is used to show that the abstract intent can be decomposed into more specific intents that are applied across geographically separate compute clusters. In this specified diagram, the "Edge" and "Core" branches represent two geographically separate clusters with the "Connection" representing the interconnect between them.

Kubernetes Controllers

In addition to the basic capabilities described herein, by leveraging cloud-native capabilities, the present disclosure integrates with existing cloud-native ecosystem tools, including best practices and policies with respect to GitOps and DevOps. Because the system allows the desired state to be specified as a text-based document, commonly called a manifest, and because the resources can be managed via Kubernetes controllers, the automated pipeline tools that are part of the Kubernetes ecosystem can be used, without change, to manage network resources. This means that operators can take advantage of the version-controlled state in the Git repository to maintain their desired state and the automate pipeline can be used to realize that state. Further, the GitOps tools allow the operator to select any previous version state and have the network set (reverted) to that state. Leveraging GitOps also allows network operators to instrument a process around change review and approval through standard Git tooling.

Kubernetes can be used as a declarative intent reconciliation engine ("controller"). The present disclosure uses the controller mechanism, that is part of cloud-native orchestration (i.e., Kubernetes), to detect configuration drift and reassert the network entity to the desired state, as specified by the model instances, providing a closed loop capability. The present disclosure can use mechanisms that follow the best practices of existing cloud-native tools, such as Kubernetes, including being compatible with the tools in the cloud-native ecosystem. The present disclosure extends cloud-native orchestration, using standard tooling and extension mechanisms, to provide the ability to specify the desired state of compatible (i.e., that support YANG and a compatible protocol) network entities.

The present disclosure includes both a modeling aspect and a behavioral aspect, via the controller, and thus supports abstract intent decomposition using standard cloud-native orchestration practices. These practices define and support mechanisms defining how decomposition should be realized and how relationships should be tracked. By using cloud-native technologies and extending them to support YANG based configuration, this disclosure extends these practices to network entities.

YANG to Kubernetes

In an embodiment, the cloud-native model can be Kubernetes, and the network entities can support bespoke models, defined via YANG. As described herein, "bespoke models" are specific to a network entity that is one of servers 12, network elements 14, applications 16, and virtualization 18. For example, a bespoke model can include multiple model instances for a router, switch, or other type of network element. As described herein, a bespoke model is one that is specifically designed and configured for a purpose on a given device class (i.e., all the same devices meaning vendor X model Y). For example, to configure telemetry on a layer 2 switch, to configure ports on the layer 2 switch, to configure an optical channel on a Dense Wave Division Multiplexing (DWDM) terminal, to configure a port on a Wavelength Selective Switch (WSS), to provision a Multiprotocol Label Switching (MPLS) tunnel at a router, and the like. As is described herein, the present disclosure provides an interface between a cloud-native model (e.g., Kubernetes) and a bespoke model (defined via YANG).

Figure 3:
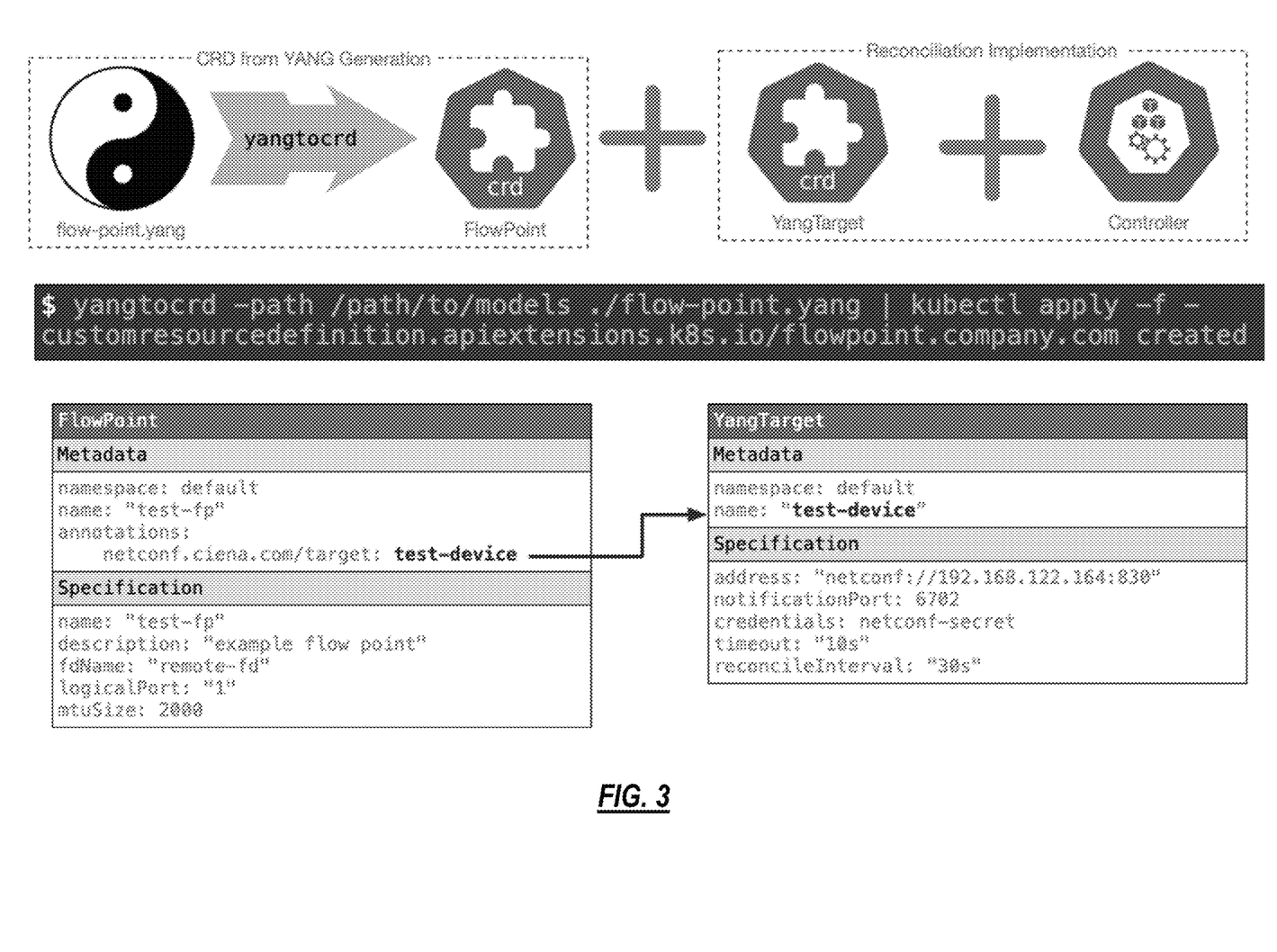
FIG. 3 is a diagram of an example conversion between YANG and Kubernetes.

The controller supports YANG models. In an embodiment, the present disclosure uses YAML as a textual representation of the model instances. YAML, on average, is less verbose than YANG. Additionally, the YANG to Open API Schema conversion mechanism can include use of patterns to reduce the verbosity of the schema and thus the verbosity of the model instances. FIG. 3 is a diagram of an example conversion between YANG and Kubernetes.

Reconciliation Drift

Figure 4:
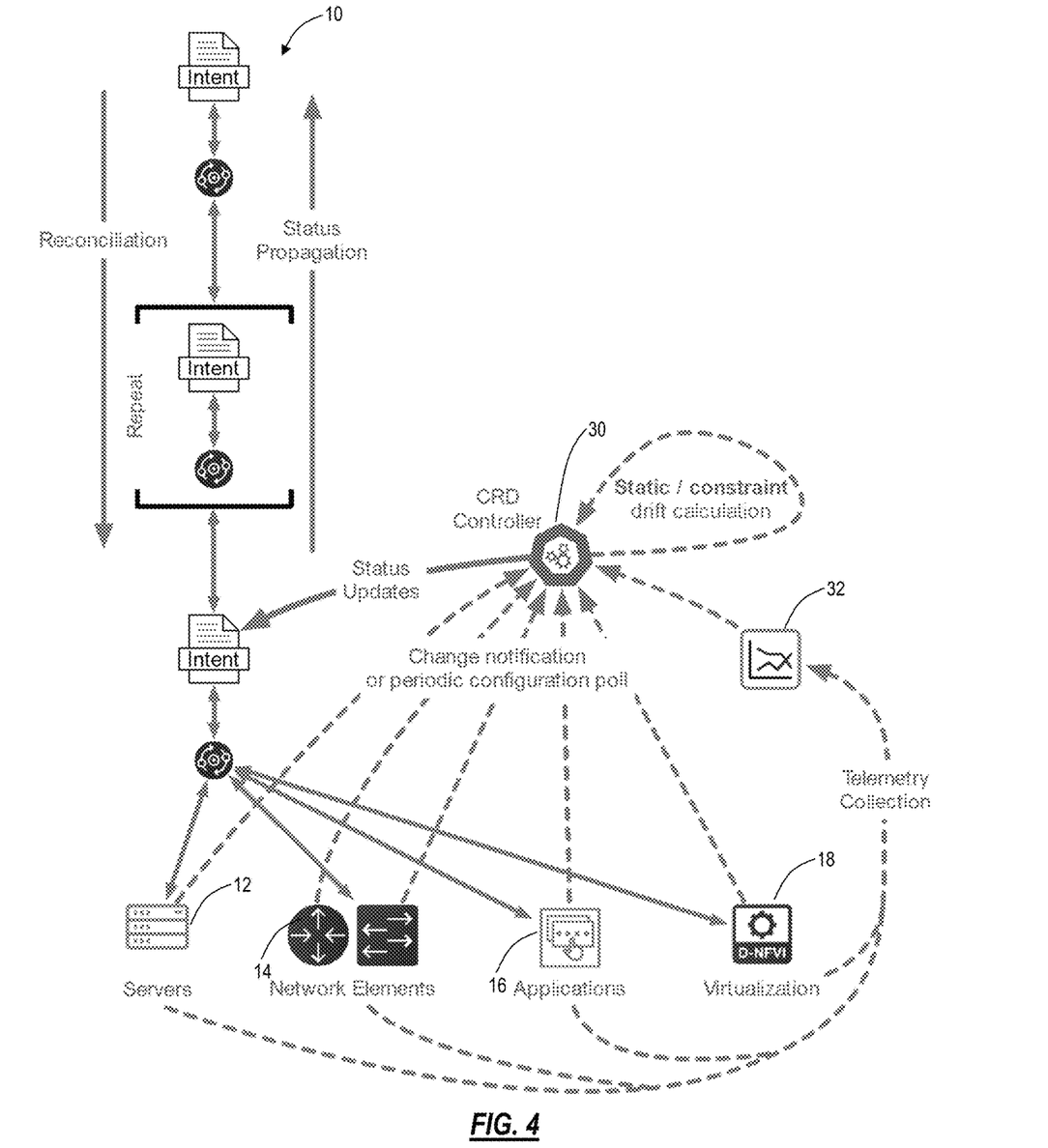
FIG. 4 is a diagram of the abstract to specific intent decomposition illustrating an example of configuration drift.

FIG. 4 is a diagram of the abstract to specific intent decomposition 10 illustrating an example of configuration drift. Drift is a difference between a specific intent and the actual operating condition (observed state) on a network entity. The present disclosure includes a Custom Resource Definition (CRD) controller 30 that receives telemetry 32 from any of the servers 12, the network elements 14, the applications, and the virtualization 18. The specific intent is based on a configuration model instance that is stored in the controller 30 for a given target—again, the target is also stored in the controller 30 and represents a given network entity. The configuration model instance includes one or more values that are compliant to the CRDs and the one or more values represent a desired state of the network entity.

The telemetry 32 can include Performance Monitoring (PM) data, Key Performance Indicators (KPIs), etc. The CRD controller 30 also receives a change notification or performs a periodic configuration poll of any of the servers 12, the network elements 14, the applications, and the virtualization 18. The CRD controller 30 can analyze/calculate any drift and provide status updates as well as remediation. The change notification is notification there a that has been some change, i.e., addition/deletion/update/ etc., of some configuration. For example, in Kubernetes, the change notification is a create/delete/update notification. In FIG. 4, the change notification refers the change notifications from the device.

There are two types of drift—static drift (also referred to as configuration drift) and constraint drift. Static drift is when the desired configuration state differs from the observed configuration state and is determined/calculated by comparing observed to desired. Note, in the present disclosure the term state refers to configuration state of a network entity (e.g., any of the servers 12, the network elements 14, the applications, and the virtualization 18). The terms state and configuration state may be used interchangeably. For a given network entity, there is a desired state that is based on a specific and/or abstract intent and an observed state that is the observed intent. The state is values, either static or dynamic. An example of a configuration state is an interface admin state (e.g., locked, unlocked, etc.), a Border Gateway Protocol (BGP) Autonomous System Number (ASN) (e.g., 64001), bandwidth settings, and basically anything configurable on a network entity. Generally, a configuration state is a configuration of one of a plurality of options, and a static drift means the observer state is different from the desired state.

Constraint drift is when the desired state differs from the observed state and is calculated by comparing observed telemetry 32 (observed state) to the desired state. The state can include characteristics which are some quantifiable measurement associated with a service, e.g., latency, jitter, bandwidth, or any KPI. The observed state is a desired characteristic of a service provided over the network. The constraint drift is when there is a difference between observed characteristics versus desired characteristics, e.g., threshold crossings (latency intent of 10 ms, actual is greater than 10 ms so there is a constraint drift), ranges (bandwidth of between 1 to 2 Gbps, actual is not in the range), and the like.

Figure 5:
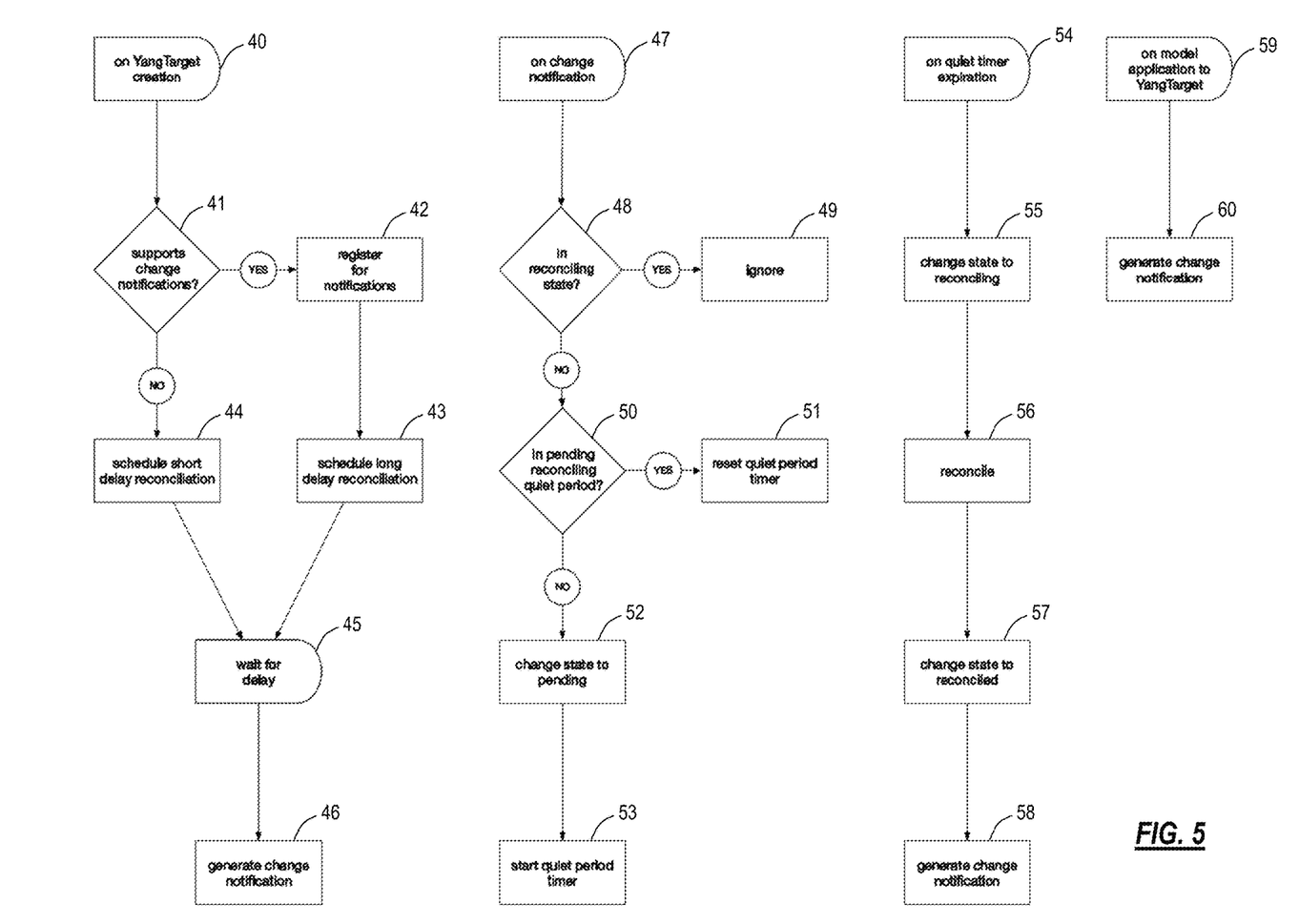
FIG. 5 is a set of flowcharts of various processes associated with static drift detection.

FIG. 5 is a set of flowcharts of various processes associated with static drift detection. If a network entity (represented by the target) supports change notifications the present disclosure leverage them as a drift indicator. In the absence of change notifications, periodic polling of the target's configuration is used. When the new model state is associated with a network entity, a synthetic change notification is created to verify desired to observed state reconciliation. Reconciliation is an expensive operation that may only be undertaken after a quiet period that is a defined period of time in which, after an initial change notification, no further change notifications occur. Reconciliation may cause additional change notifications. When reconciliation is "complete", an additional reconciliation (drift calculation) is scheduled to determine if the network entity is actually "reconciled."

On the creation of a YangTarget (step 40), it is determined whether the YangTarget (YangTarget is a network entity) supports change notifications (step 41), and if so, the controller 30 registers for notifications (step 42) with a scheduled long delay reconciliation (step 43). If the YangTarget does not support change notifications (step 41), then the controller 30 schedules short delay reconciliation (step 44). Here, the change notifications will alert the CRD controller 30 if there is a change. If there are notifications, then the controller 30 can wait longer, or eliminate periodic polling, for reconciliation since any intermediate change would be notified. The controller 30 waits for delay (step 45) and generates a change notification (step 46).

On a change notification (step 47), the controller 30 checks if it is in the reconciling state (step 48), and if so, ignores the change notification (step 49). If the controller 30 is not in the reconciling state (step 48), the controller 30 checks if there is a pending reconciling quiet period (step 50), and if so, the quiet period timer is reset (step 51). If there is not a pending reconciling quiet period (step 50), the controller 30 changes the state to pending (step 52), and starts a quiet period timer (step 53).

Upon expiration of the quiet timer (step 54), the state is changed to reconciling (step 55), reconciliation is performed (step 56), the state is changed to reconciled (step 57), and a change notification is generated (step 58). On model application to YangTarget (step 59), a change notification is generated (step 60).

Figure 6:
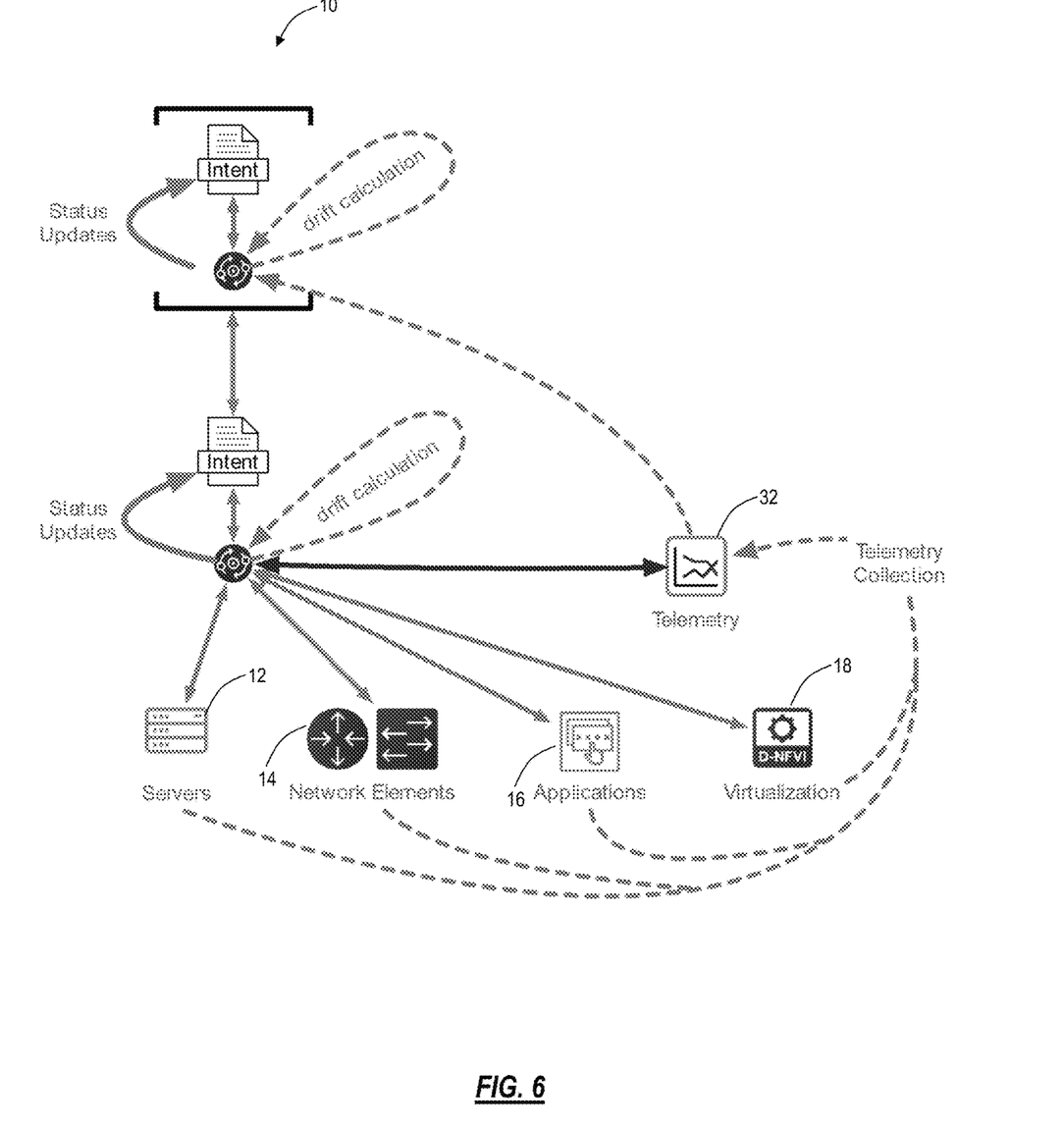
FIG. 6 is a diagram of the abstract to specific intent decomposition illustrating an example of calculating constraint drift.

FIG. 6 is a diagram of the abstract to specific intent decomposition 10 illustrating an example of calculating constraint drift. The collection of the telemetry 32 is known and can be provided by various known techniques. For example, the telemetry 32 can be any of pushed, pulled, streamed, consolidated from intermediate devices, etc. from the network entity (i.e., the servers 12, the network elements 14, the applications 16, the virtualization 18, and the like. Telemetry collection and events can be part of an intent realization. Intents would need to be defined that describe state such as latency, jitter, drops, etc, e.g., states that are dynamic in the network. The controllers 30 for these intents would have to leverage the telemetry to determine if the intent was in violation. Constraint drift works specific to abstract to reestablish compliance. The most specific intent has only static drift as it represents a target's configuration state.

EXAMPLES

Figure 7:
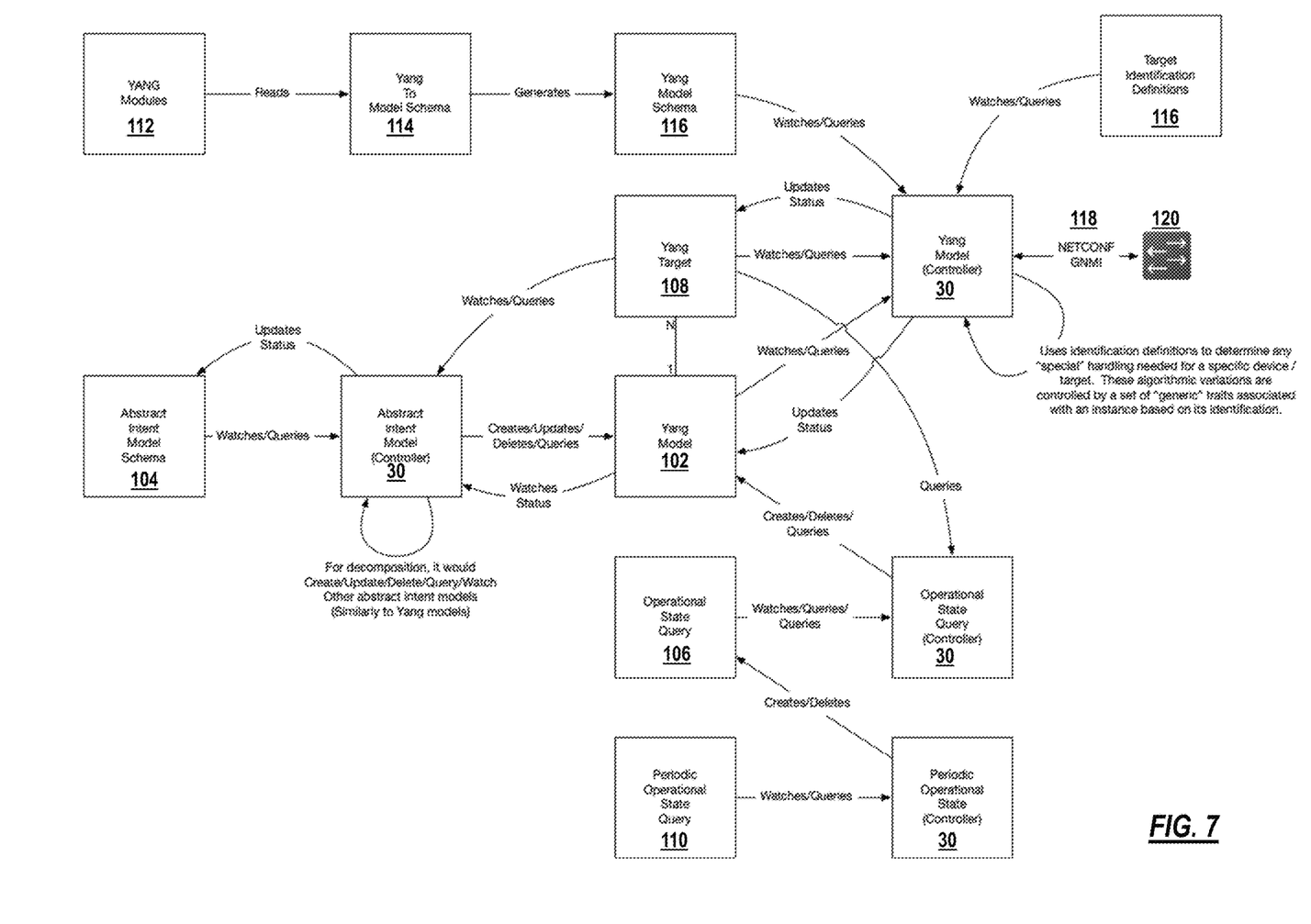
FIG. 7 is a diagram of interaction between YANG modules and abstract intent model schema and the controllers that are used to reconcile the intents to the network entities.

FIG. 7 is a is a diagram that depicts an embodiment of the present disclosure as set of components and their interactions. The boxes (components) in FIG. 7 represent either data records or executed processes and the lines with arrows represent interactions in terms of watching/querying, updating, creating, deleting, reading, generating, etc. Of note, the controller 30 is configured to manage a YangModel 102, manage abstract intent model 104, query operational state 106 to a network entity represented by a YangTarget 108, and perform a periodic operational state query 110. Again, operational state is the same as observed state or simply observed.

Before the controller 30 performs any of the above functions, the bespoke YANG models (YANG modules 112) are read and YANG modules (or module) is converted to model schema 114, i.e., OpenAPI CRDs (YANG schema 116). Note, this conversion process can be performed separately from the controller 30, such as via a script or the like. The controller 30 receives a converted bespoke model (YANG module 112) which are OpenAPI schema that is a CRD.

Additionally, target identification definitions 116 are provided to the controller 30. A target as used herein is a data record which identifies the connectivity parameters to a network entity. Note, as used herein, the network entity is the endpoint in a network (anything that understands YANG) and the target is the representation of the network entity in the controller 30. The connectivity parameters can include, e.g., Internet Protocol (IP) address, username, password, certificates, or any credentials. NETCONF 118 is one example protocol for the controller 30 to communicate with a network entity 120; other protocols are contemplated.

Figure 8:
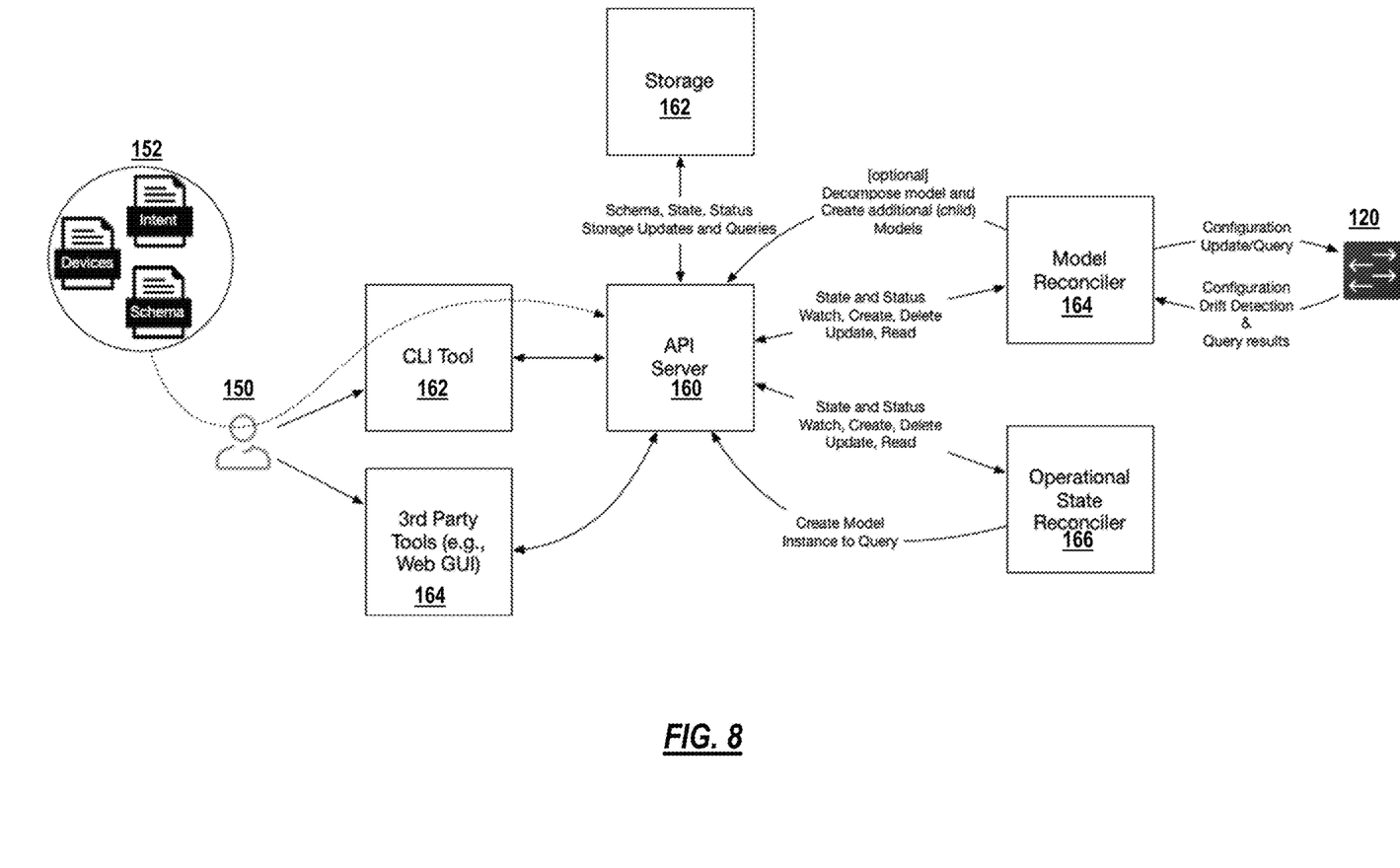
FIG. 8 is a diagram of an API service interacting with end users (e.g., Command Line Interpreter (CLI), Web Graphical User Interface (GUI)) with model reconcilers and operational state reconcilers.

FIG. 8 is a diagram of an API service interacting with end users (e.g., Command Line Interpreter (CLI), Web Graphical User Interface (GUI)) with model reconcilers and operational state reconcilers. FIG. 8 is a diagram of a more abstract (higher level) embodiment than FIG. 7. Here there is a user 150, such as a network operator, Network Operations Center (NOC) personnel, engineer, technician, etc. that has some data 152, i.e., device info (target), intent, schema, etc. The user 150 can perform the YANG to CRD conversion and can provide the data 152 to an API server 160, such as via a Command Line Interface (CLI) tool 162 or some third-party tools 164 (e.g., a web based Graphical User Interface (GUI), etc.). The API server 160 can store 162 the data 152 and perform a model reconciler 164 and an operational state 166. The model reconciler 164 interfaces with the network entity 120.

Process

Figure 9:
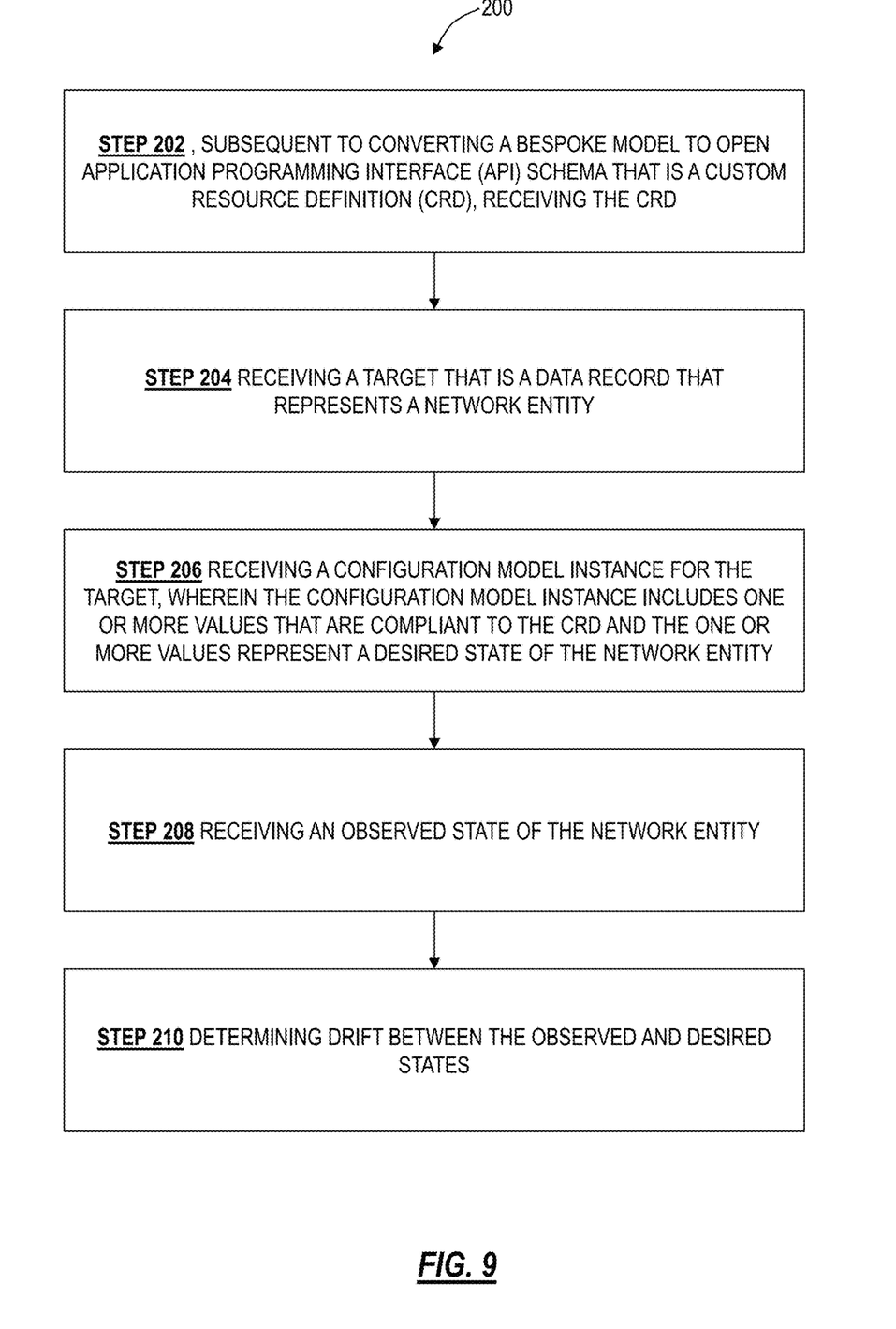
FIG. 9 is a flowchart of a process for a cloud-native approach to support desired state model reconciliation with networking equipment.

FIG. 9 is a flowchart of a process 200 for a cloud-native approach to support desired state model reconciliation with networking equipment. The process 200 is described with reference to functions performed by the controller 30, e.g., a Kubernetes controller. The process 100 contemplates implementation as a method having steps, via a processing device with one or more processors and memory having instructions that, when executed, cause the one or more processors to implement the steps (i.e., an implementation of the controller 30), and as a non-transitory computer-readable medium with instructions that, when executed, cause one or more processors to implement the steps (again the implementation of the controller.

In an embodiment, the process 200 includes, subsequent to converting a bespoke model to Open Application Programming Interface (API) Schema that is a Custom Resource Definition (CRD), receiving 202 the CRD. Note, converting the bespoke model (i.e., YANG) can be performed separately from the controller 30. Next, the process 200 includes receiving 204 a target that is a data record that represents a network entity. As described herein, "receiving" for the controller 30 can be via an API call or other command. Next, the process 200 includes receiving 206 a configuration model instance for the target, wherein the configuration model instance includes one or more values that are compliant to the CRD and the one or more values represent a desired state of the network entity. The configuration model instance are some values for representing a network entity and desired intent (configuration state). Next, the process 200 includes receiving 208 an observed state of the network entity 120. Again, the observed state is what is actually happening or what is actually configured on the network entity 120. Further, the process 200 includes determining 210 drift between the observed and desired states.

Again, the bespoke models are YANG, for specific hardware/software of the network entity 120. The YANG is converted into cloud-native models, i.e., Open API schema that is CRD deployed on the controller 30. The controller 30 then imports a target for the network entity 120. Again, YANG along with a compatible protocol, such as NETCONF, provides a mechanism to query/edit configurations of the network entity 120 (i.e., the servers 12, the network elements 14, the applications 16, and/or the virtualization 18.

The steps can include, based on one of a range and a threshold, and responsive to determined drift being in violation for some predetermined time, triggering reconciliation to achieve the desired state. Some drift from the desired state that lasts a short period of time may not need reconciliation where other drift can be persistent requiring a reconfiguration. For example, if one intent is to receive some telemetry data every minute and the network entity 120 is sending every two minutes, then there is a need to reconfigure. In another example, if this is only late once, no need to reconfigure. Based on the range and/or threshold means an observed value or state differs from the desired state, e.g., is outside, below, or above the range; exceeds the threshold; is below the threshold; or the like.

The network entity 120 is one of a server 12, a network element 14, an application 16, a virtualized 18 instance of the server 12 or the network element 14, and an endpoint in a network that utilizes YANG. The receiving 208 an observed state can be based on one or more of a change notification from and a periodic poll to the network entity. The network entity (12) can have multiple bespoke models each being converted to a corresponding CRD. The one or more bespoke models utilize YANG. The one or more bespoke models can be one of locally stored schema files and schema directly queried from the network entity 120. The states can be one of a configuration (static drift) and a characteristic (constraint drift). The characteristic can be one of latency, jitter, bandwidth, and any Key Performance Indicator (KPI). For static or configuration drift, where the desired configured state of a device is different from the observed, the desired state is always reasserted to the network entity 120. For constraint drift, where the desired state is a set of characteristics, such as latency, jitter, etc., the drift may not immediately require a change or revaluation or the intent as the cost of network change could outweigh the benefit, particularly if the constraint "corrects itself" in short order.

An example of static drift can include, in a BGP configuration, the ASN number. There is a desired state in the configuration model instance, e.g., 64001. The controller 30 will keep this as the desired state in the configuration model instance. Now, assume the controller 30 either queries the network entity 120, via the info in the target, or receives a change notification from the network entity 120, and assume the observed state for the ASN number is 64002. This is static drift. The controller FIG. 30 out what to do on the network entity 120, i.e., the minimal change set, and then pushes it down to the network entity 120. Then the controller 30 performs a verification check, now the controller's job is to monitor this observed state for change. Again, with change notifications, the controller 30 subscribes and can get a change notification which it will use to detect drift and determine whether there is a need to reconcile. If the network entity 120 does not support change notifications, the controller 30 will periodically poll to obtain the observed state. The ASN is an example of a configuration state that is static. Any difference between observed and desired is called configuration or static drift.

For higher-level intents, e.g., "I want a low latency connection—less than 20 ms." That intent is decomposed into lower-level intents, i.e., specific intent, that represent the network entity 120 configuration to realize this higher-level intent. The network entity 120 can also be provisioned for telemetry collection, i.e., notify me when a certain KPI or telemetry hits something. The lower-level models are pushed to network entity and the controller 30 can get events or telemetry when the latency is violated. For example, assume now the latency is 30 ms (observed state) which is in drift from the 20 ms desired state. The controller 30 can make decisions based on policy, e.g., out of compliance—do noting now, but if still violated after 5 min, reevaluate the higher-level intent—perhaps different devices, different configuration.

In another embodiment, a processing device includes one or more processors and memory with instructions that, when executed, cause the one or more processors to implement the process 100 as described above.

In a further embodiment, a process can include generating first instances of cloud-native models from one or more bespoke models, wherein each of the one or more bespoke models is associated with a network entity 120 and used for configuration thereof; generating second instances of the one or more bespoke models from the first instances of cloud-native models, for use in a cloud-native system; monitoring operation of the network entity 120 (polling and/or change notifications); and detecting drift from intent associated with the first instances of cloud-native models to actual conditions on the network entity 120.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

The invention claimed is:

1. A method comprising steps of:
   subsequent to converting a bespoke model to Open Application Programming Interface (API) Schema that is a Custom Resource Definition (CRD), receiving the CRD;
   receiving a target that is a data record that represents a network entity;
   receiving a configuration model instance for the target, wherein the configuration model instance includes one or more values that are compliant to the CRD and the one or more values represent a desired state of the network entity;
   receiving an observed state of the network entity; and
   determining drift between the observed and desired states, wherein the drift includes (1) static drift where the desired state differs from the observed state based on configuration and is determined/calculated based on a comparison therebetween, and (2) constraint drift where the desired state differs from the observed state based on characteristics of the network entity and is calculated by comparing observed telemetry that determines the observed state to the desired state.

2. The method of claim 1, wherein the steps include based on one of a range and a threshold, and responsive to determined drift being in violation for some predetermined time, triggering reconciliation to achieve the desired state.

3. The method of claim 1, wherein the network entity is one of a server, a network element, an application, a virtualized instance of the server or the network element, and an endpoint in a network that utilizes YANG (Yet Another Next Generation).

4. The method of claim 1, wherein the receiving an observed state is based on one or more of a change notification from and a periodic poll to the network entity.

5. The method of claim 1, wherein the network entity has multiple bespoke models each being converted to a corresponding CRD.

6. The method of claim 1, wherein the bespoke model utilizes YANG (Yet Another Next Generation).

7. The method of claim 1, wherein the bespoke model is one of locally stored schema files and schema directly queried from the network entity.

8. The method of claim 1, wherein the states are one of a configuration and a characteristic.

9. A controller comprising:
   one or more processors and memory storing instructions that are configured to program the one or more processors to
      subsequent to converting a bespoke model to Open Application Programming Interface (API) Schema that is a Custom Resource Definition (CRD), receive the CRD,
      receive a target that is a data record that represents a network entity,
      receive a configuration model instance for the target, wherein the configuration model instance includes one or more values that are compliant to the CRD and the one or more values represent a desired state of the network entity,
      receive an observed state of the network entity; and
      determine drift between the observed and desired states, wherein the drift includes (1) static drift where the desired state differs from the observed state based on configuration and is determined/calculated based on a comparison therebetween, and (2) constraint drift where the desired state differs from the observed state based on characteristics of the network entity and is calculated by comparing observed telemetry that determines the observed state to the desired state.

10. The controller of claim 9, wherein the instructions are further configured to program the one or more processors to based on one of a range and a threshold, and responsive to determined drift being in violation for some predetermined time, trigger reconciliation to achieve the desired state.

11. The controller of claim 9, wherein the network entity is one of a server, a network element, an application, a virtualized instance of the server or the network element, and an endpoint in a network that utilizes YANG (Yet Another Next Generation).

12. A non-transitory computer-readable medium comprising instructions for programming one or more processors to implement steps of:
  subsequent to converting a bespoke model to Open Application Programming Interface (API) Schema that is a Custom Resource Definition (CRD), receiving the CRD;
  receiving a target that is a data record that represents a network entity;
  receiving a configuration model instance for the target, wherein the configuration model instance includes one or more values that are compliant to the CRD and the one or more values represent a desired state of the network entity;
  receiving an observed state of the network entity; and
  determining drift between the observed and desired states, wherein the drift includes (1) static drift where the desired state differs from the observed state based on configuration and is determined/calculated based on a comparison therebetween, and (2) constraint drift where the desired state differs from the observed state based on characteristics of the network entity and is calculated by comparing observed telemetry that determines the observed state to the desired state.

13. The non-transitory computer-readable medium of claim 12, wherein the steps include
  based on one of a range and a threshold, and responsive to determined drift being in violation for some predetermined time, triggering reconciliation to achieve the desired state.

14. The non-transitory computer-readable medium of claim 12, wherein the network entity is one of a server, a network element, an application, a virtualized instance of the server or the network element, and an endpoint in a network that utilizes YANG (Yet Another Next Generation).

15. The non-transitory computer-readable medium of claim 12, wherein the receiving an observed state is based on one or more of a change notification from and a periodic poll to the network entity.

16. The non-transitory computer-readable medium of claim 12, wherein the network entity has multiple bespoke models each being converted to a corresponding CRD.

17. The non-transitory computer-readable medium of claim 12, wherein the bespoke model utilizes YANG (Yet Another Next Generation).

18. The non-transitory computer-readable medium of claim 12, wherein the bespoke model is one of locally stored schema files and schema directly queried from the network entity.

19. The non-transitory computer-readable medium of claim 12, wherein the observed telemetry includes one or more of Performance Monitoring (PM) data and Key Performance Indicators (KPIs).

20. The non-transitory computer-readable medium of claim 19, wherein the characteristics are a quantifiable measurement that includes one of latency, jitter, bandwidth, and any Key Performance Indicator (KPI).

* * * * *